(12) United States Patent
Hunt et al.

(10) Patent No.: US 8,770,845 B1
(45) Date of Patent: Jul. 8, 2014

(54) ROTARY BEARING AND METHOD OF MANUFACTURE

(71) Applicants: Mark Hunt, Lafayette, LA (US); Chad M. Daigle, Lafayette, LA (US)

(72) Inventors: Mark Hunt, Lafayette, LA (US); Chad M. Daigle, Lafayette, LA (US)

(*) Notice: Subject to any disclaimer, the term of this patent is extended or adjusted under 35 U.S.C. 154(b) by 0 days.

(21) Appl. No.: 13/676,209

(22) Filed: Nov. 14, 2012

(51) Int. Cl.
*F16C 17/02* (2006.01)
*F16C 33/24* (2006.01)

(52) U.S. Cl.
USPC .......................................... 384/283; 384/302

(58) Field of Classification Search
CPC ........ F16C 17/03; F16C 17/035; F16C 17/06; F16C 17/065; F16C 33/108; F16C 33/26
USPC ......... 29/898.042, 898.047, 898.051; 384/95, 384/282, 284, 285
See application file for complete search history.

(56) References Cited

U.S. PATENT DOCUMENTS

| 4,410,054 | A | 10/1983 | Nagel |
| 4,620,601 | A | 11/1986 | Nagel |
| 4,764,036 | A | 8/1988 | McPherson |
| 5,342,129 | A * | 8/1994 | Dennis et al. ................. 384/420 |
| 5,368,398 | A | 11/1994 | Damm |
| 6,062,736 | A | 5/2000 | Zemickel |
| 7,255,480 | B2 | 8/2007 | John |
| 7,946,768 | B2 | 5/2011 | Cooley |
| 8,069,933 | B2 | 12/2011 | Sexton |
| 2007/0046120 | A1 * | 3/2007 | Cooley et al. ............... 310/90.5 |
| 2009/0097788 | A1 * | 4/2009 | Cooley et al. ................ 384/107 |
| 2010/0218995 | A1 * | 9/2010 | Sexton et al. .................. 175/57 |
| 2012/0039551 | A1 * | 2/2012 | Cooley et al. .................. 384/26 |
| 2012/0255789 | A1 * | 10/2012 | Cooley et al. ................ 175/170 |
| 2012/0281938 | A1 * | 11/2012 | Peterson et al. ............. 384/306 |

* cited by examiner

*Primary Examiner* — Phillip A Johnson

(57) ABSTRACT

A bearing assembly and method of construction that provides a bearing having a plurality of individual flat bearing disc inserts, such as carbide inserts, supported directly upon a flat insert support surface. The method of construction utilizes a mold for simultaneously brazing the inserts to the bearing surface.

18 Claims, 5 Drawing Sheets

DETAIL A

US 8,770,845 B1

ROTARY BEARING AND METHOD OF MANUFACTURE

FIELD OF THE INVENTION

This invention pertains to radial bearings for rotating machines and equipment. More particularly, it pertains to rotary bearing for use in downhole equipment for oil and gas wells.

BACKGROUND OF THE INVENTION

Radial bearing assemblies are utilized in many machine and tool applications to reduce rotational friction and to radial support loads. Such radial assemblies are often employed in downhole drilling motors that are commonly used for drilling boreholes in the earth for oil and gas exploration. Some radial bearing assemblies employ a pair of opposing support members each having an opposing, groove or bearing race. A plurality of supporting bearing balls is positioned in the opposing races between the support members. As one support member rotates about the other upon the bearing balls, the bearing loads are transferred to the balls and the balls rotate in the races to reduce rolling resistance and friction between the opposing support members. The bearing balls are made of a variety of materials including an assortment of steels, ceramics, or hybrids of steel and ceramics. Other radial bearing assemblies employ elongated rollers in place of the bearing balls.

Still other radial bearing assemblies employ the use of flat hard discs or plates know as inserts to line the surface of opposing support members. The hard smooth surface of the inserts serve to reduce resistance and friction between the opposing support members as these support members rotate with respect to each other. Such bearing inserts are typically made of a hard carbide such as tungsten carbide, titanium carbide, silicon carbide, diamond silicon carbide composites, polycrystalline cubic boron nitride, or polycrystalline diamond, provide high strength, wear resistance and low friction between rotating support members.

When radial bearing assemblies are constructed with such bearing inserts, each individual insert is placed in a bearing hole or aperture on the surface of the support members and attached by brazing or spot welding the insert in place on the support member or to a corresponding bearing ring positioned adjacent to the support member. A bearing hole or aperture is required for attaching the disc to the bearing surface because of the difficulties encountered when welding a flat disc to the round bearing surface. Further, the machining of individual holes or apertures for the inserts and then spot welding or brazing each individual insert in place in its aperture is time consuming and expensive. Consequently a need exists to facilitate the fabrication of radial bearings that utilize such disc inserts.

SUMMARY OF THE INVENTION

The present invention is a radial bearing assembly and method of construction that provides a radial bearing having a plurality of individual flat bearing disc inserts, such as carbide inserts, supported directly upon a flat insert support surface. The radial bearing assembly and method of construction eliminates the need for machining multiple individual insert holes or apertures to support the inserts and the need for spot welding or brazing each individual insert in place in its corresponding aperture.

The radial bearing assembly is comprised of a tubular bearing support member or bearing sleeve having a plurality of radially spaced longitudinal extending bearing insert retainer slots. Each bearing insert retainer slot is machined to provide a flat surface to support and retain a desired plurality of individual hard carbide bearing disc inserts. During manufacture the plurality disc inserts are simultaneously brazed in place in the retainer slots. A hard solder or brazing material such as one comprised of carbide powder combined with copper, nickel or other alloy and a flux is used for brazing the disc inserts in place in the retainer slots.

To fabricate the bearing assembly with the disc inserts in place, a tubular bearing sleeve is provided and a desired number of spaced apart bearing insert retainer slots are machined in a desired array around the periphery of the bearing sleeve. The bearing insert retainer slots are machined to have a flat bottom surface and are sized to retain a desired number of flat insert discs of a desired shape and configuration.

After the bearing sleeve is machined with the desired number of bearing insert retainer slots, an outer brazing mold is positioned around the bearing, sleeve, and a desired plurality of disc inserts are then inserted into each slot. Brazing material is then inserted between the bearing sleeve and the brazing mold and heated in order to simultaneously braze and hold the entire plurality of disc inserts in place in the retainer slots. After brazing, the brazing mold and the extraneous brazing material is removed by machining or other suitable means to leave the bearing sleeve intact with the disc inserts securely fastened within the insert retainer slots.

The method may be adapted for placing bearing disc inserts on the interior periphery of a bearing sleeve. In such a case, bearing insert retainer slots are machined in spaced radial intervals around the internal diameter of the bearing sleeve. An inner brazing mold is then inserted into the bearing sleeve and a desired number of disc inserts are placed in each retainer slot. Brazing material is then inserted between the bearing sleeve and the inner brazing mold and heated in order to hold the inserts in place in the retainer slots. After brazing, the inner brazing mold and the extraneous brazing material is removed by machining or other means leaving the bearing sleeve intact with the disc inserts securely fastened within the insert retainer slots. A similar method of construction may also be adapted for thrust bearings.

DESCRIPTION OF THE EMBODIMENTS

Figure 1:
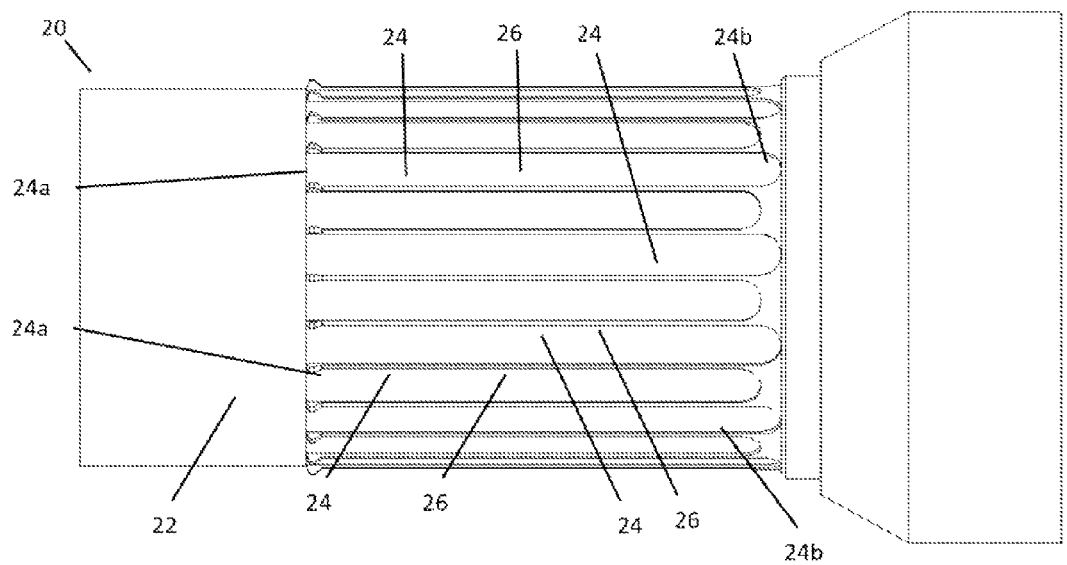
FIG. 1 is a side view of the bearing, sleeve of the radial bearing assembly described herein.
Figure 2:
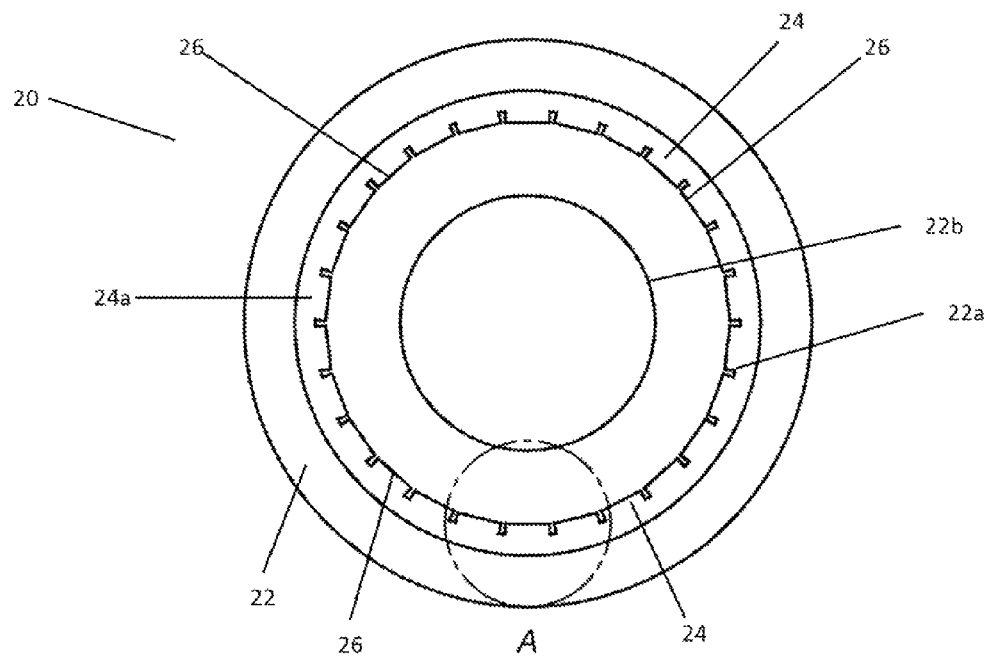
FIG. 2 is an end view of the bearing sleeve of the radial bearing assembly shown in FIG. 1.
Figure 3:
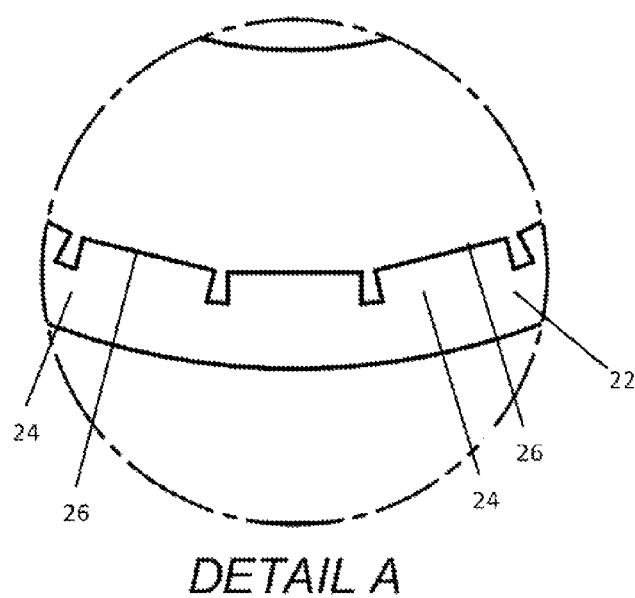
FIG. 3 is detail view of the bearing insert retainer slots shown in FIG. 2.

FIGS. 1-3 show the bearing sleeve (20) of the radial bearing assembly (10) of applicant's invention. The bearing sleeve (20) is comprised, of a tubular support member (22) having a plurality of radially spaced, longitudinal extending, bearing insert retainer slots (24). Each bearing insert retainer slot (24) has an open end (24a) and a closed end (24b) and is machined to provide a flat bearing surface (26) for supporting and retaining a desired plurality of individual bearing disc inserts (28). FIG. 2 presents an end view of the bearing sleeve of the radial bearing assembly shown in FIG. 1. The area designated as Detail A in FIG. 2 is shown in FIG. 3.

Figure 4:
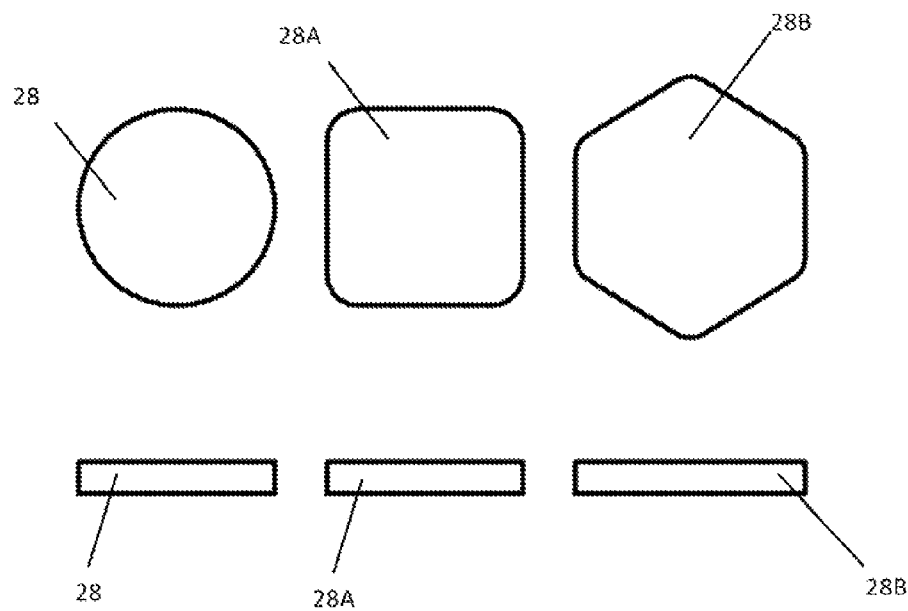
FIG. 4 shows a top view and a side view of a bearing disc insert for the radial bearing assembly shown in FIG. 1.

The disc inserts (28) shown by way of example in FIG. 4 are discrete flat bearing elements. The disc inserts (28) are shown as round but the disc inserts (28) may be of any suitable geometric shape including but not limited to round, oval, square, rectangular, trapezoidal, pentagonal, hexagonal, octagonal, or other such shape. By way of example only, FIG. 4 shows round discs inserts (28), square disc inserts (28A) and hexagonal disc inserts (28B). For the purpose of this description the term disc insert (28) will include any discrete flat bearing element of any suitable configuration. It is thought that each disc insert (28) will be constructed of hard, high strength, wear resistance and low friction materials such as hard carbide including materials comprised of tungsten carbide, titanium carbide, silicon carbide, diamond silicon carbide composites or polycrystalline cubic, boron nitride and polycrystalline diamond material.

To fabricate the bearing sleeve (20) of the bearing assembly (10) shown in FIG. 1, a desired number of spaced apart bearing insert retainer slots (24) with flat bearing surfaces (26) are machined in a desired array around the exterior periphery (22a) of the support member (22). After the retainer slots (24) are formed in the support member (22), the support member (22) is placed with an outer brazing mold (30) and a desired number of disc inserts (28) are placed in each slot (24) through the open end (24a) of each slot (24). In this manner, as shown in FIG. 5, a desired plurality of the disc insert (2) are positioned within and along each longitudinal extending bearing insert retainer slot (24) between the support member (22) and the brazing mold (30).

Figure 5:
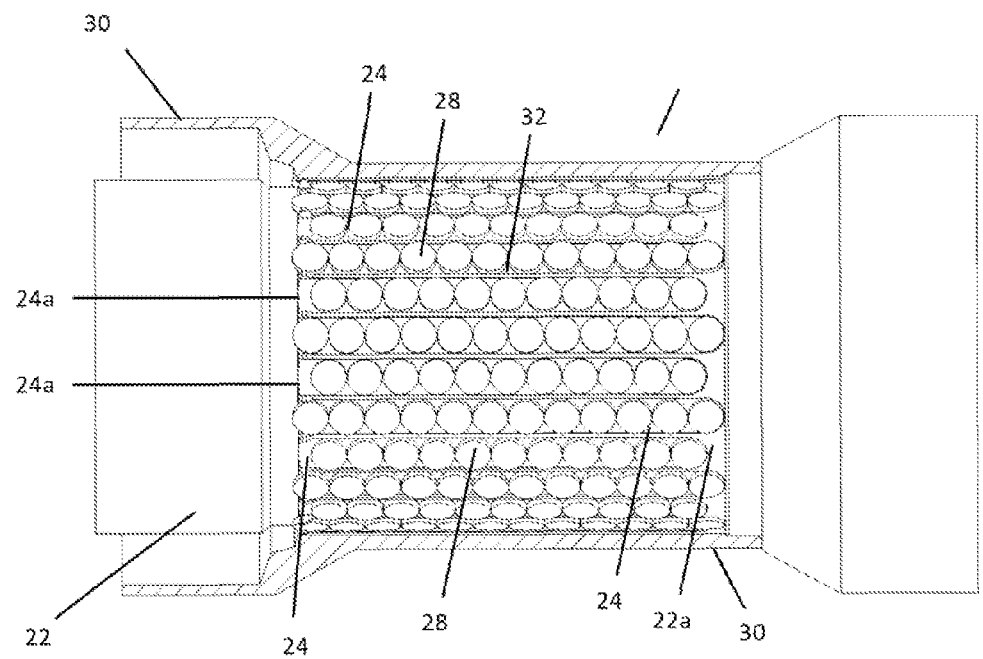
FIG. 5 is a partial cross-section view of the radial bearing assembly shown in FIG. 1 inserted into an outer brazing mold.

As shown in FIG. 5, the outer brazing mold (30) is configured to have an interior diameter sufficient to allow the insertion of the disc inserts (28) into each slot (24) and to new for the insertion of a desired quantity of hard solder or brazing material (32) into the annulus created between the interior diameter of the brazing mold (30) and the external diameter of the support member (22) and the spaces around the disc inserts (28) in each slot (24). The brazing material (32) may be any suitable brazing material such as one comprised of carbide powder combined with copper, nickel or other alloy and a flux, or the like.

Figure 6:
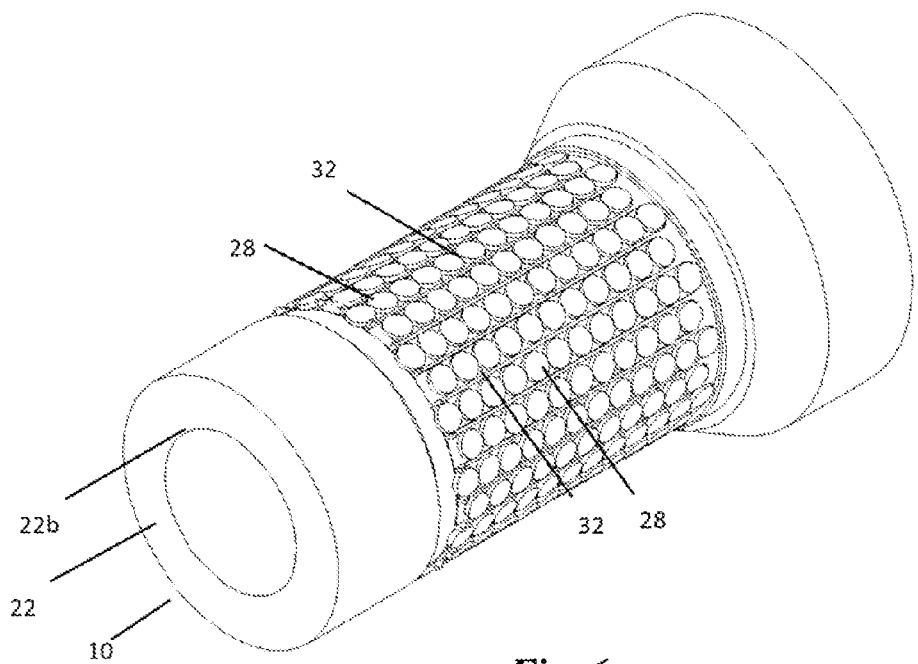
FIG. 6 is an isometric view of a completed radial bearing assembly manufactured in accordance with the methods described herein.

The brazing material (32) is then heated to simultaneously braze and hold the disc inserts (28) in place in the slots (24) between the support member (22) and the outer mold (30). After brazing, the brazing mold (30) and the extraneous brazing material (32) are machined away from the exterior periphery (22a) support member (22) leaving the support member (22) intact with the disc inserts (28) securely fastened within the insert retainer slots (24) creating the hearing assembly (10) in a manner as shown in FIG. 6.

As can be seen in FIG. 1 and FIG. 5, the length of each retainer slot (24) may be varied in length. When the slots (24) are so varied, the disc inserts (28) will be staggered or offset. This will allow the space between disc inserts (28) on adjoining slots (24) to be reduced and increase the bearing surface area of the bearing assembly (10).

Figure 7:
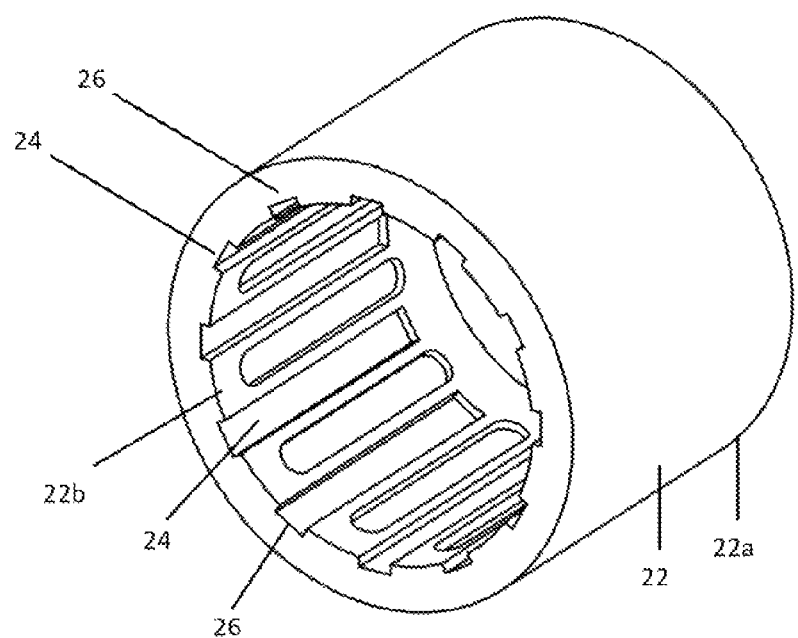
FIG. 7 is a partial cross-section view of the radial bearing assembly inserted over an inner brazing mold.

The method may be adapted by placing bearing disc inserts (28) on the interior periphery (22b) of a support member (22) as shown in FIG. 7. In such a case, bearing insert retainer slots (24) are machined in spaced radial intervals around the internal periphery (22b) of the support member (22). An inner brazing mold is then inserted into the support member (22) and a desired number of disc inserts (28) are placed in each retainer slot (24) at the open end (24a) between the inner brazing mold and the outer support member (22). Brazing material is then inserted between the support member (22) and the inner brazing mold and heated in order to simultaneously braze and hold the disc inserts (28) in place in the retainer slots (24). After brazing, the inner brazing mold and the extraneous brazing material is machined away from the support member (22) leaving it intact with the disc inserts (28) securely fastened within the insert retainer slots around the interior periphery (22b) of the support member (22) to create a radial bearing.

Figure 8:
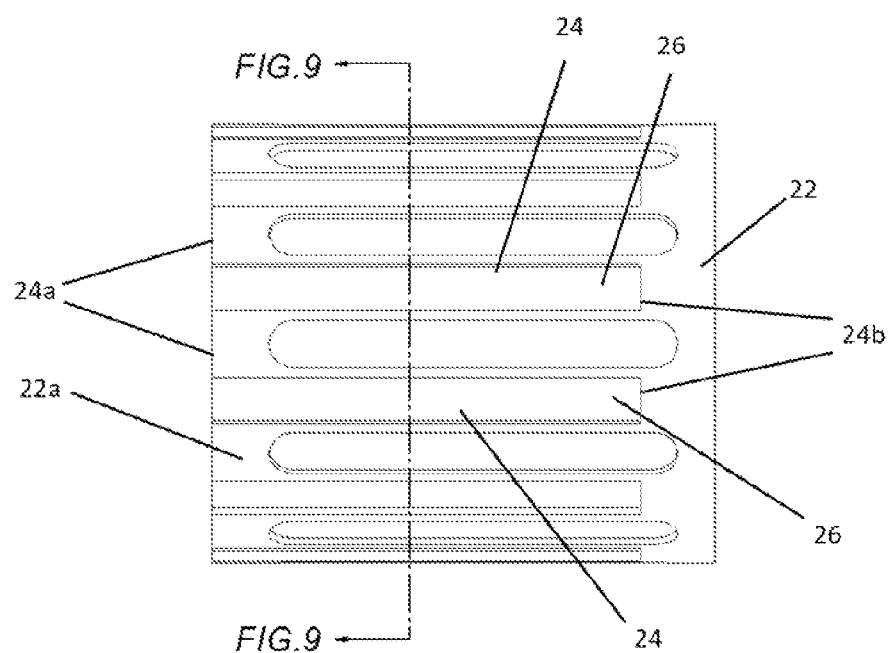
FIGS. 8-10 show alternate embodiments of the bearing sleeve support member of the radial bearing assembly described herein.
Figure 9:
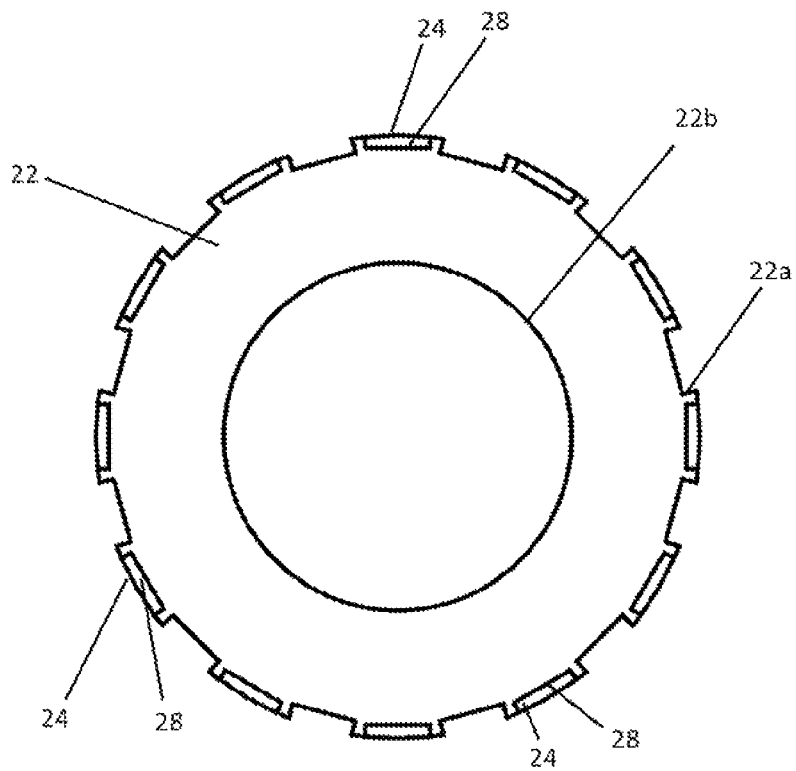
Figure 10:
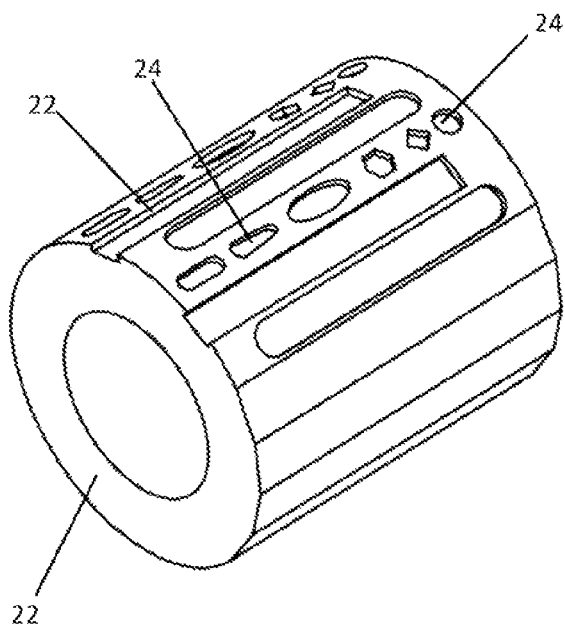

FIG. 8-FIG. 10 show an alternate embodiment of the bearing sleeve support member (22) of the radial bearing assembly described herein. FIG. 8 is a side elevation view of an alternate embodiment of the sleeve support member (22). FIG. 9 is a cross-section view of the sleeve support member (22) shown in FIG. 8.

As shown in FIG. 10, the support member (22) may have the retainer slots (24) for holding disc inserts (28) configured in any number of suitable shapes. In each embodiment the support member (22) has a plurality of disc insert retainer slots (24) each having a flat bearing surface (26) for supporting and retaining a desired plurality of correspondingly configured bearing, disc inserts. The support member (22) with inserted disc may be used in conjunction with a brazing mold as described herein to simultaneously braze and hold the disc inserts in place in the retainer slots (24).

Similar methods of construction may also be readily adapted for thrust bearings. In one such method a thrust bearing support member may be provided with a plurality of disc retainer spaces of a desired configuration such as a slot, circle or other desired geometric figure. A corresponding bearing disc insert (28) similar to that shown in FIG. 4 may then be inserted in the disc retainer space.

It is thought that the radial bearing assembly and the method of manufacture presented herein as well as their attendant advantages will be understood from the foregoing description and it will be apparent that various changes may be make in the form, construction and arrangement of the parts and steps thereof without departing from the spirit and scope of the invention or sacrificing all of its material advantages, the form described herein being merely an example embodiment of the invention.

LISTING OF PARTS

Radial bearing assembly (10)
Bearing Sleeve (20)
Support member (22)
Bearing insert retainer slots (24)
Flat bearing surface (26)
Bearing disc inserts (28)
Outer brazing mold (30)
Brazing material (32)

We claim:
1. A bearing assembly comprising:
    (a) a support member, said support member having a plurality of bearing insert retainer slots, each said slot having a fiat bearing surface;
    (b) a plurality of flat bearing disc inserts positioned within each said bearing insert retainer slot against said flat bearing surface; and

(c) brazing material positioned around each of said flat bearing disc inserts in each said bearing insert retainer slot whereby when heat is applied to said brazing material said bearing disc inserts will simultaneously be brazed and held in place within said bearing insert retainer slots.

2. The bearing assembly as recited in claim 1 wherein said bearing disc inserts and said brazing material are positioned between a brazing mold and said support member.

3. The radial bearing assembly as recited in claim 1 wherein each said bearing disc insert and said brazing material is positioned between said tubular support member and a brazing mold.

4. The radial bearing assembly as recited in claim 3 wherein said bearing insert retainer slots are radially spaced apart around the exterior periphery of said tubular support member.

5. The radial bearing assembly as recited in claim 3 wherein said bearing insert retainer slots are radially spaced apart around the interior periphery of said tubular support member.

6. The radial bearing assembly as recited in claim 3 wherein each said slot retains at least one bearing insert.

7. The radial bearing assembly as recited in claim 3 wherein said disc inserts are carbide inserts.

8. A radial bearing assembly comprising:
  (a) a tubular support member, said support member having a plurality of longitudinally extending, radially spaced, bearing insert retainer slots, each said bearing insert retainer slot having a flat bearing surface;
  (b) a plurality of flat bearing disc inserts positioned within each said bearing insert retainer slot; and
  (c) brazing material positioned around each said bearing disc insert in each said bearing insert retainer slot whereby when heat is applied to said brazing material, each said bearing disc insert positioned within each said bearing insert retainer slot will be simultaneously brazed and held in place within said bearing insert retainer slot against said flat bearing surface of said retainer slot.

9. A radial bearing assembly comprising:
  (a) a tubular support member, said support member having a plurality of longitudinally extending, radially spaced, bearing insert retainer slots, each said slot having a flat bearing surface;
  (b) (c) a plurality of flat bearing disc inserts positioned between said tubular support member within each said bearing insert retainer slot against said flat bearing surface of said bearing insert retainer slot; and
  (c) brazing material fed into a space created between said tubular support member and a removable tubular brazing mold, whereby when heat is applied to said brazing material, each said disc insert, positioned within each said bearing insert retainer slot will be simultaneously brazed and held in place within said bearing insert retainer slot against said flat bearing surface of said retainer slot.

10. The radial bearing assembly as recited in claim 9 wherein when said brazing mold is removed, each said bearing disc insert discs is held in place within said bearing insert retainer slot by said brazing material.

11. The radial bearing assembly as recited in claim 10 wherein said slots are radially spaced apart around the exterior periphery of said tubular support member.

12. The radial bearing assembly as recited in claim 10 wherein said slots are radially spaced apart around the interior periphery of said tubular support member.

13. The radial bearing assembly as recited in claim 10 wherein each said slot retains at least one bearing insert disc.

14. A radial bearing assembly comprising:
  (a) a tubular support member, said support member having a plurality of longitudinally extending, radially spaced and longitudinally staggered bearing insert retainer slots each said slot having a flat bearing surface;
  (b) a plurality of flat bearing disc inserts positioned between said tubular support member within each said bearing insert retainer slot against said flat bearing surface of said bearing insert retainer slot; and
  (c) brazing material fed into a space created between said tubular support member, whereby when heat is applied to said brazing material, each said disc insert positioned within each said bearing insert retainer slot will be simultaneously brazed and held in place within said bearing insert retainer slot against said flat bearing surface of said retainer slot.

15. The radial bearing assembly as recited in claim 14 wherein each said bearing disc insert discs is held in place within said bearing insert retainer slot by said brazing material.

16. The radial hearing assembly as recited in claim 15 wherein said slots are longitudinally staggered relative to each other and radially spaced apart around the exterior periphery of said tubular support member.

17. The radial bearing assembly as recited in claim 15 wherein said slots are longitudinally staggered relative to each other and radially spaced apart around the interior periphery of said tubular support member.

18. The radial bearing assembly as recited in claim 15 wherein each said slot retains at east one bearing insert disc.

\* \* \* \* \*